(12) United States Patent
Park

(10) Patent No.: US 9,389,394 B2
(45) Date of Patent: *Jul. 12, 2016

(54) LENS MODULE

(71) Applicant: SAMSUNG ELECTRO-MECHANICS CO., LTD., Suwon-si (KR)

(72) Inventor: Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 78 days.

This patent is subject to a terminal disclaimer.

(21) Appl. No.: 14/173,665

(22) Filed: Feb. 5, 2014

(65) Prior Publication Data
US 2015/0049393 A1 Feb. 19, 2015

(30) Foreign Application Priority Data
Aug. 16, 2013 (KR) .......... 10-2013-0097123

(51) Int. Cl.
*G02B 9/62* (2006.01)
*G02B 13/00* (2006.01)

(52) U.S. Cl.
CPC .............. *G02B 9/62* (2013.01); *G02B 13/0045* (2013.01)

(58) Field of Classification Search
CPC ................. G02B 3/04; G02B 13/0045; G02B 9/00–9/64; G02B 15/00–15/28; G02B 13/18
USPC ........................... 359/713, 754–757, 708, 759
See application file for complete search history.

(56) References Cited

U.S. PATENT DOCUMENTS

| 8,385,006 | B2 * | 2/2013 | Tsai et al. | ...................... 359/713 |
| 8,599,495 | B1 * | 12/2013 | Tsai et al. | ...................... 359/708 |
| 8,854,744 | B2 * | 10/2014 | Liao et al. | ...................... 359/713 |
| 9,046,672 | B2 * | 6/2015 | You | ..................... G02B 13/0045 |
| 2012/0243108 | A1 | 9/2012 | Tsai et al. | |
| 2012/0314304 | A1 * | 12/2012 | Huang | .......................... 359/759 |

* cited by examiner

*Primary Examiner* — Thomas K Pham
*Assistant Examiner* — Ibrahima Diedhiou
(74) *Attorney, Agent, or Firm* — NSIP Law

(57) ABSTRACT

There is provided a lens module including: a first lens having positive refractive power; a second lens having positive refractive power; a third lens having refractive power; a fourth lens having negative refractive power; a fifth lens of which an object-side surface is convex; and a sixth lens having an inflection point formed on an image-side surface or an object-side surface thereof.

27 Claims, 8 Drawing Sheets

LENS MODULE

CROSS-REFERENCE TO RELATED APPLICATION

This application claims the benefit of Korean Patent Application No. 10-2013-0097123, filed on Aug. 16, 2013, with the Korean Intellectual Property Office, the disclosure of which is incorporated herein in its entirety by reference.

BACKGROUND

The present technology generally relates to a lens module, and more specifically, to a lens module including an imaging optical system including six lenses. Unless otherwise indicated herein, the materials described in this section are not prior art to the claims herein and are not admitted to be prior art by inclusion in this section.

Mobile communications terminals may include inbuilt cameras so that a video call and photographing are possible. In addition, as functions of the cameras in the mobile communications terminals have gradually increased, cameras for mobile communications terminals have been gradually required to have high degrees of resolution and performance.

However, since there is a trend for mobile communications terminals to be miniaturized and lightened, there is a limitation in implementing a camera having such high degrees of resolution and performance in the mobile communications terminals.

In order to solve these problems, recently, lenses of such camera have been formed of plastic, lighter than glass, and a lens module has been configured using five or more lenses in order to implement a high degree of resolution.

However, it is more difficult to improve chromatic aberration and to implement a relatively bright optical system with lenses formed of plastic than lenses formed of glass.

SUMMARY

Some embodiments of the present disclosure may provide a lens module capable of improving an aberration effect and implementing high resolution.

According to some embodiments of the present disclosure, a lens module may include, in order from an object side to an image side: a first lens having positive refractive power; a second lens having positive refractive power; a third lens having refractive power; a fourth lens having negative refractive power; a fifth lens in which an object-side surface is convex; and a sixth lens having an inflection point formed on an image-side surface or an object-side surface thereof.

The first to sixth lenses may be formed of plastic.
Both surfaces of the first lens may be convex.
An image-side surface of the second lens may be convex.
The third lens may have negative refractive power.
An object-side surface of the third lens may be concave.
The fourth lens may have a meniscus shape, convex toward an image side.
The object-side surface of the fifth lens may be convex, and an image-side surface thereof may be concave.
The fifth lens may have an inflection point formed on the object-side surface or an image-side surface thereof.
The fifth lens may have negative refractive power.
The object-side surface of the sixth lens may be convex.
The image-side surface of the sixth lens may be concave.
The sixth lens may have negative refractive power or positive refractive power.

At least one of object-side surfaces and image-side surfaces of the first to sixth lenses may be aspherical.

An optical system including the first to sixth lenses may satisfy Conditional Equation 1:

$$0.6 < f1/f < 1.2 \qquad \text{[Conditional Equation 1]}$$

where f is an overall focal length [mm] of the optical system, and f1 is a focal length [mm] of the first lens.

An optical system including the first to sixth lenses may satisfy Conditional Equation 2:

$$|v2 - v3| > 25.0 \qquad \text{[Conditional Equation 2]}$$

where v2 is an abbe number of the second lens, and v3 is an abbe number of the third lens.

An optical system including the first to sixth lenses may satisfy Conditional Equation 3:

$$0.8 < f2/f < 1.4 \qquad \text{[Conditional Equation 3]}$$

where f2 is a focal length [mm] of the second lens, and f is an overall focal length [mm] of the optical system.

An optical system including the first to sixth lenses may satisfy Conditional Equation 4:

$$0.5 < |f3/f| < 1.1 \qquad \text{[Conditional Equation 4]}$$

where f3 is a focal length [mm] of the third lens, and f is an overall focal length [mm] of the optical system.

An optical system including the first to sixth lenses may satisfy Conditional Equation 5:

$$f4/f < -10.0 \qquad \text{[Conditional Equation 5]}$$

where f4 is a focal length [mm] of the fourth lens, and f is an overall focal length [mm] of the optical system.

An optical system including the first to sixth lenses may satisfy Conditional Equation 6:

$$f5/f < -5.0 \qquad \text{[Conditional Equation 6]}$$

where f5 is a focal length [mm] of the fifth lens, and f is an overall focal length [mm] of the optical system.

An optical system including the first to sixth lenses may satisfy Conditional Equation 7:

$$|f6/f| > 3.0 \qquad \text{[Conditional Equation 7]}$$

where f6 is a focal length [mm] of the sixth lens, and f is an overall focal length [mm] of the optical system.

An optical system including the first to sixth lenses may satisfy Conditional Equation 8:

$$OAL/f < 1.4 \qquad \text{[Conditional Equation 8]}$$

where OAL is a distance [mm] from an object-side surface of the first lens to an image surface, and f is an overall focal length [mm] of the optical system.

An optical system including the first to sixth lenses may satisfy Conditional Equation 9:

$$0.4 < f1/f2 < 1.1 \qquad \text{[Conditional Equation 9]}$$

where f1 is a focal length [mm] of the first lens, and f2 is a focal length [mm] of the second lens.

An optical system including the first to sixth lenses may satisfy Conditional Equation 10:

$$|f2/f3| < 1.5 \qquad \text{[Conditional Equation 10]}$$

where f2 is a focal length [mm] of the second lens, and f3 is a focal length [mm] of the third lens.

An optical system including the first to sixth lenses may satisfy Conditional Equation 11:

$$BFL/f > 0.25 \qquad \text{[Conditional Equation 11]}$$

where BFL is a distance [mm] from the image-side surface of the sixth lens to an image surface, and f is an overall focal length [mm] of the optical system.

An optical system including the first to sixth lenses may satisfy Conditional Equation 12:

$$D1/f<0.5 \qquad \text{[Conditional Equation 12]}$$

where D1 is an air gap [mm] between the first and second lenses, and f is an overall focal length [mm] of the optical system.

An optical system including the first to sixth lenses may satisfy Conditional Equation 13:

$$r1/f>0.5 \qquad \text{[Conditional Equation 13]}$$

where r1 is a radius of curvature [mm] of an object-side surface of the first lens, and f is an overall focal length [mm] of the optical system.

An optical system including the first to sixth lenses may satisfy Conditional Equation 14:

$$|r4/f|<1.0 \qquad \text{[Conditional Equation 14]}$$

where r4 is a radius of curvature [mm] of an image-side surface of the second lens, and f is an overall focal length [mm] of the optical system.

BRIEF DESCRIPTION OF DRAWINGS

Embodiments of the present disclosure will be more clearly understood from the following description taken in conjunction with the accompanying drawings, in which.

DETAILED DESCRIPTION

Figure 1:
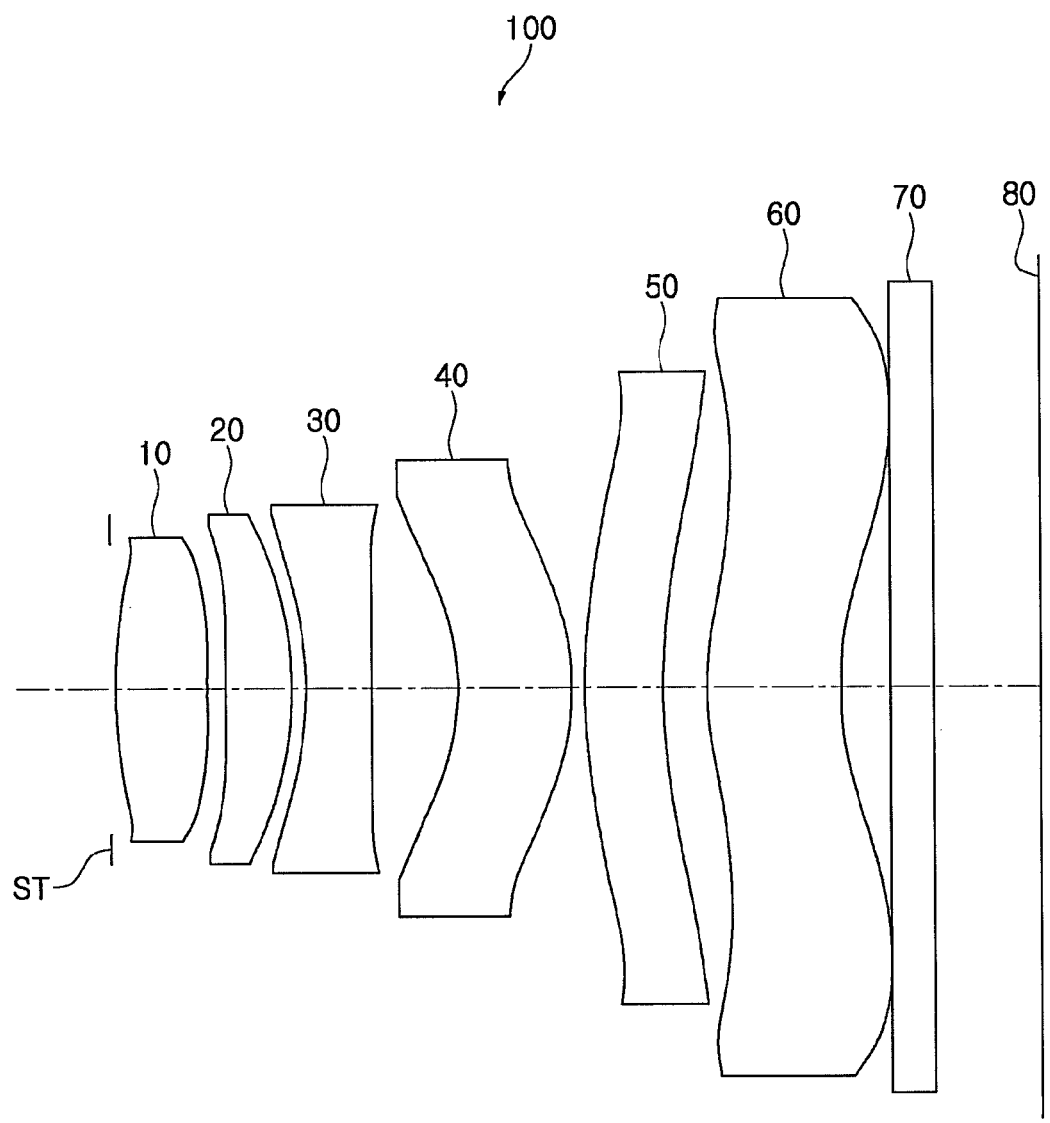
FIG. 1 is a configuration diagram of a lens module according to a first exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

In addition, it is to be noted that in the present specification, a first lens refers to a lens that is the closest to an object, and a sixth lens refers to a lens that is the closest to an image sensor. Further, it is noted to be that the term 'front' refers to a direction from the lens module toward an object, while the term 'rear' refers to a direction from the lens module toward an image sensor. Further, it is to be noted that in each lens, a first surface refers to a surface toward an object (or an object-side surface) and a second surface refers to a surface toward an image side (or an image-side surface). In addition, it is to be noted that the present specification, units of all of numerical values of radii of curvature, thicknesses, OALs, BFLs, and D1 of lenses are in millimeter (mm) units.

Figure 2:
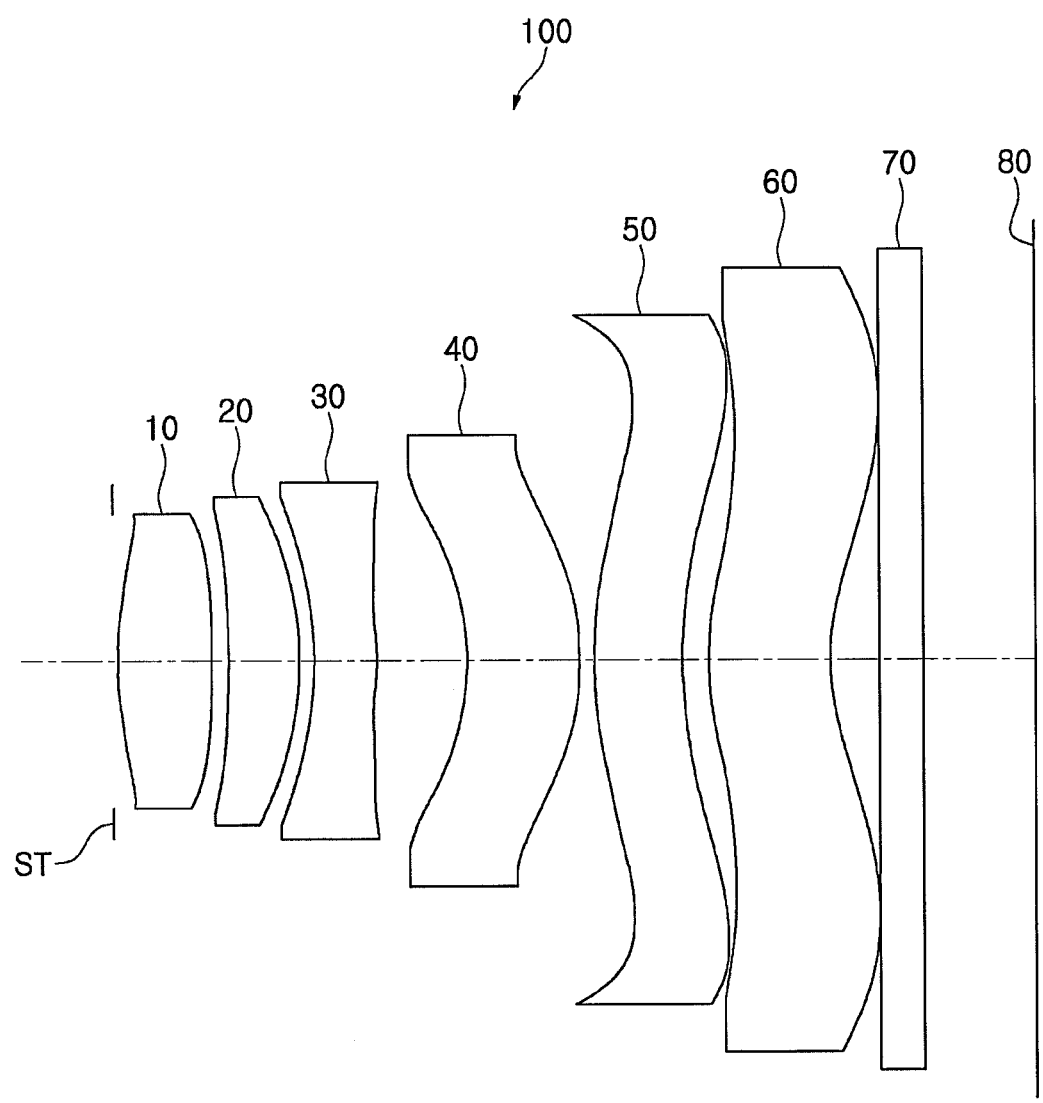
FIG. 2 is a configuration diagram of a lens module according to a second exemplary embodiment of the present disclosure.
Figure 3:
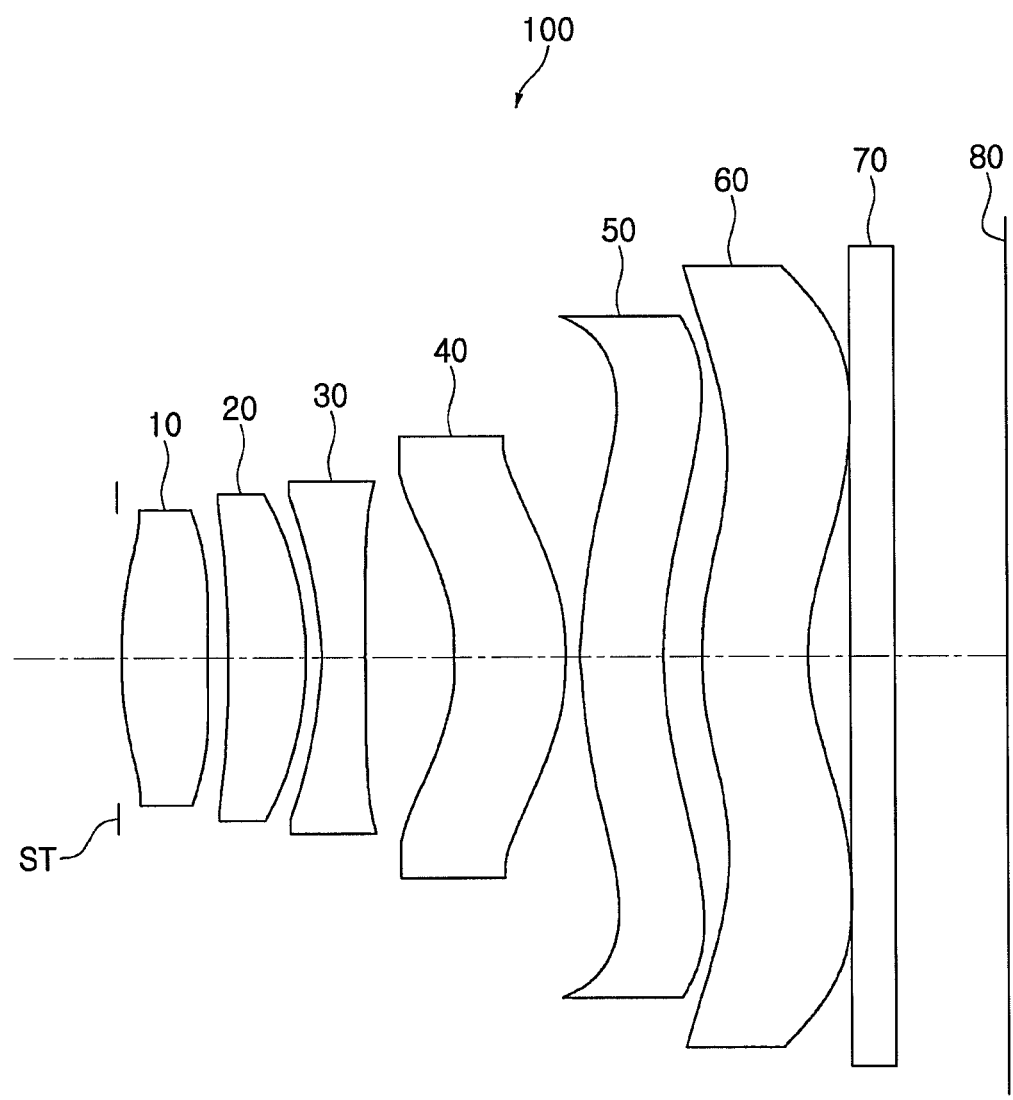
FIG. 3 is a configuration diagram of a lens module according to a third exemplary embodiment of the present disclosure.
Figure 4:
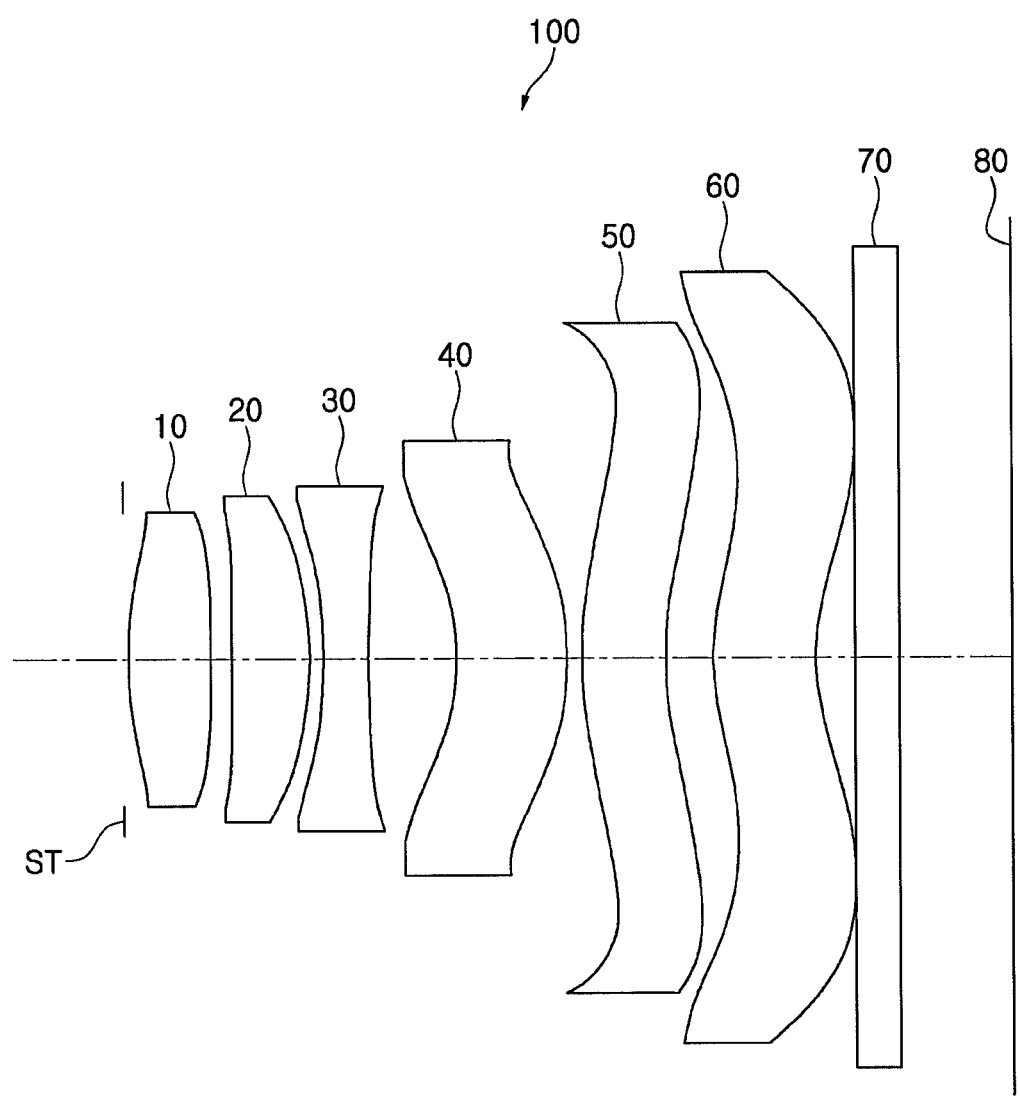
FIG. 4 is a configuration diagram of a lens module according to a fourth embodiment of the present disclosure.
Figure 5:
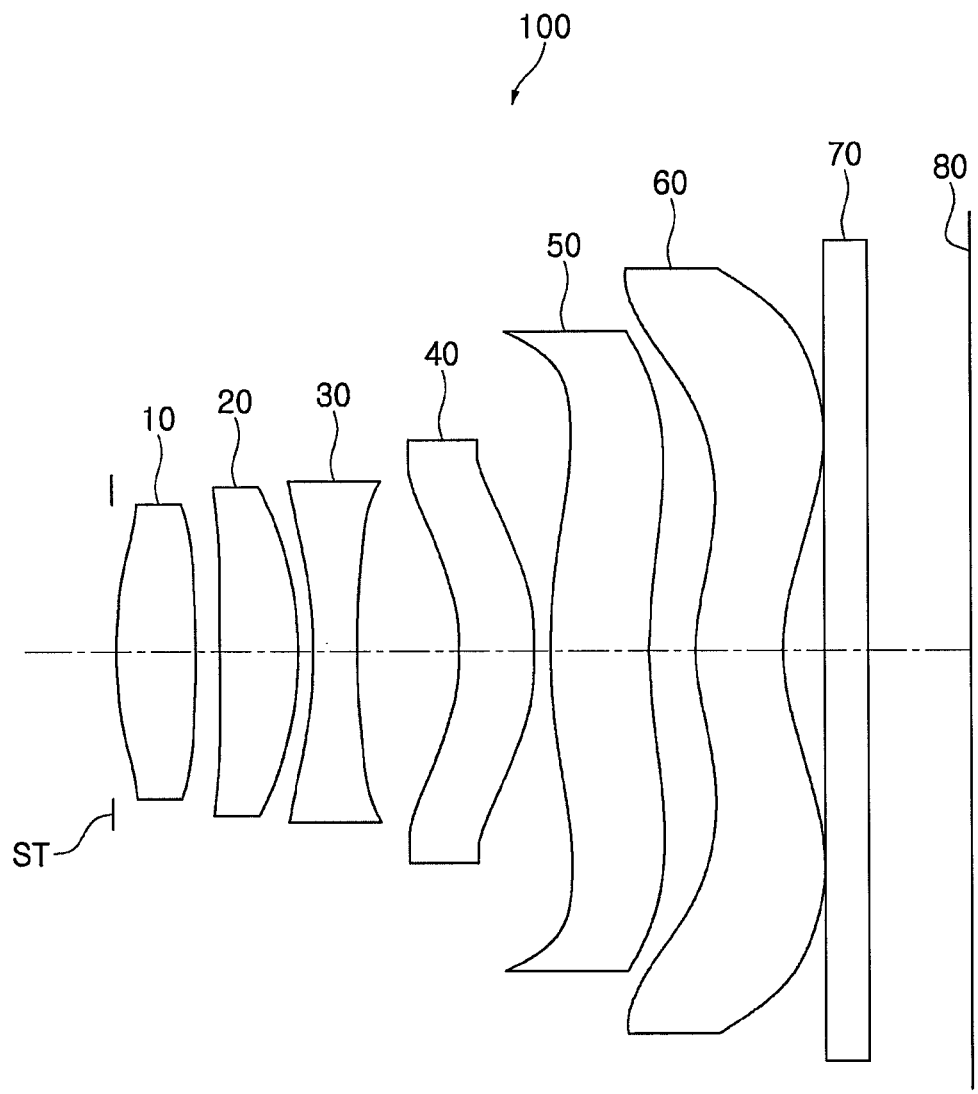
FIG. 5 is a configuration diagram of a lens module according to a fifth exemplary embodiment of the present disclosure.
Figure 6:
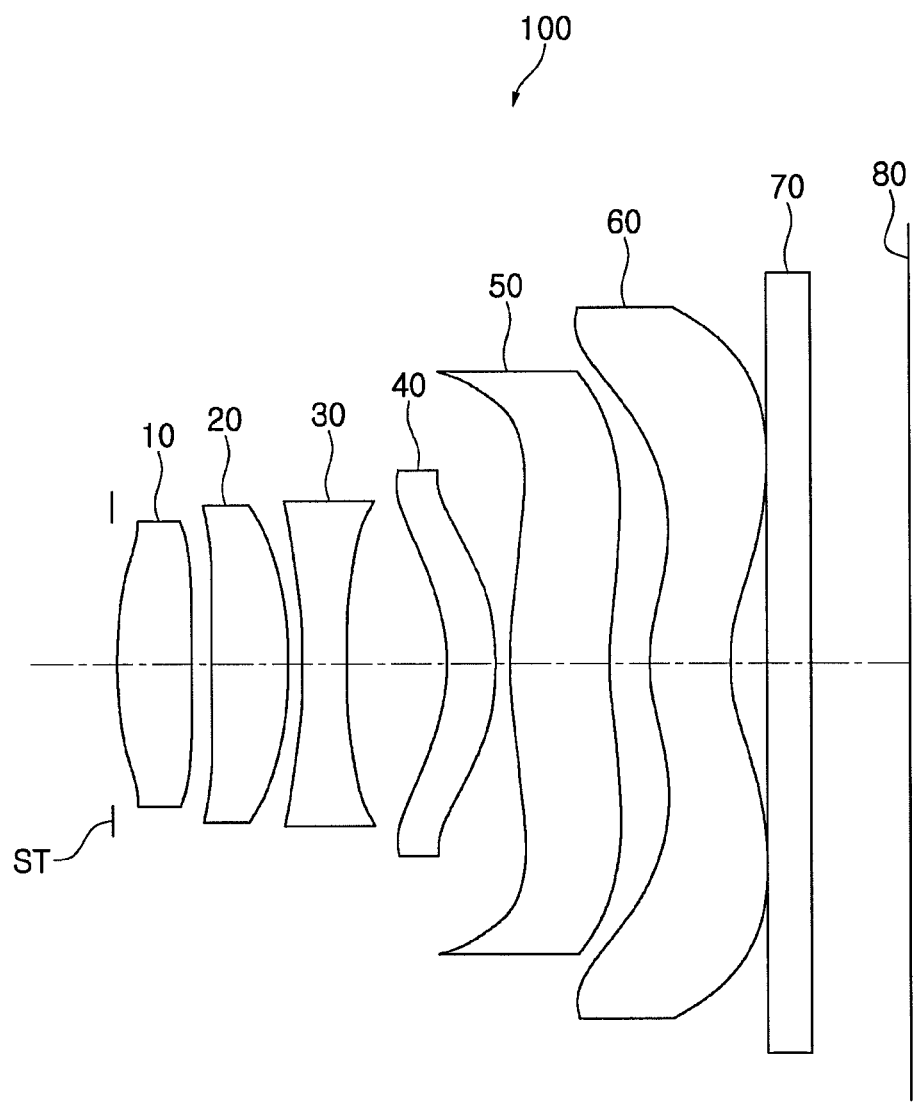
FIG. 6 is a configuration diagram of a lens module according to a sixth exemplary embodiment of the present disclosure.
Figure 7:
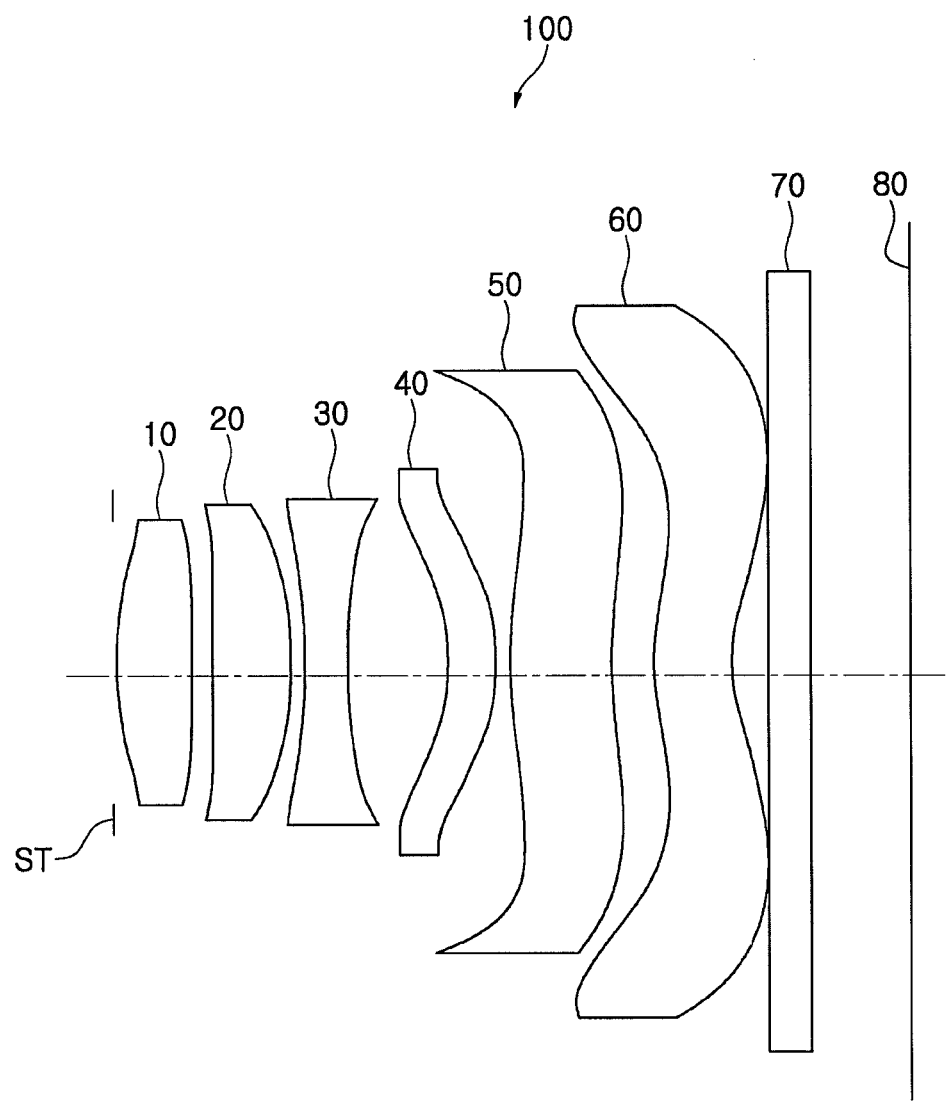
FIG. 7 is a configuration diagram of a lens module according to a seventh exemplary embodiment of the present disclosure.
Figure 8:
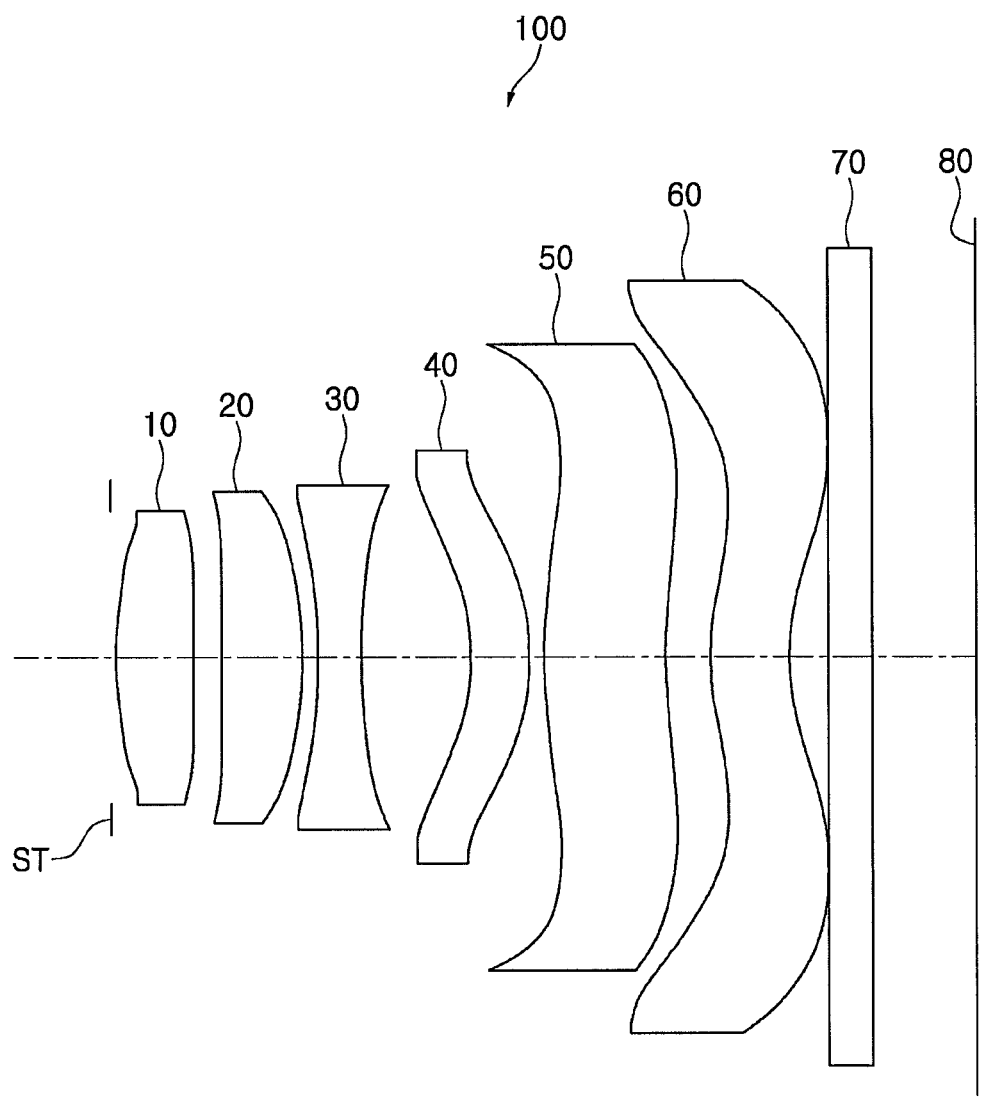
FIG. 8 is a configuration diagram of a lens module according to an eighth exemplary embodiment of the present disclosure.

FIG. 1 is a configuration diagram of a lens module according to a first exemplary embodiment of the present disclosure; FIG. 2 is a configuration diagram of a lens module according to a second exemplary embodiment of the present disclosure; FIG. 3 is a configuration diagram of a lens module according to a third exemplary embodiment of the present disclosure; FIG. 4 is a configuration diagram of a lens module according to a fourth embodiment of the present disclosure; FIG. 5 is a configuration diagram of a lens module according to a fifth exemplary embodiment of the present disclosure; FIG. 6 is a configuration diagram of a lens module according to a sixth exemplary embodiment of the present disclosure; FIG. 7 is a configuration diagram of a lens module according to a seventh exemplary embodiment of the present disclosure; and FIG. 8 is a configuration diagram of a lens module according to an eighth exemplary embodiment of the present disclosure.

A lens module according to the present disclosure may include an optical system including six lenses. In detail, the lens module may include a first lens, a second lens, a third lens, a fourth lens, a fifth lens, and a sixth lens. However, the lens module is not limited to including only six lenses, but may further include other components if necessary. For example, the lens module may include a stop for controlling an amount of light. In addition, the lens module may further include an infrared cut-off filter cutting off infrared light. Further, the lens module may further include an image sensor converting an image of a subject incident through the optical system into an electrical signal. Further, the lens module may further include an interval maintaining member adjusting an interval between lenses.

The first to sixth lenses configuring the optical system may be formed of plastic. In addition, at least one of the first to sixth lenses may have an aspherical surface. Further, the first to sixth lenses may have at least one aspherical surface. That is, at least one of first and second surfaces of the first to sixth lenses may be aspherical.

In addition, the optical system including the first to sixth lenses may have positive refractive power/positive refractive power/negative refractive power/negative refractive power/negative refractive power/negative refractive power or positive refractive power/positive refractive power/negative refractive power/negative refractive power/negative refractive power/positive refractive power sequentially from an object side. The optical system configured as described above may improve optical performance through aberration improvement. In addition, the optical system configured as described above may improve sensitivity of the lens by decreasing a refraction angle. Therefore, in the lens module according to the present disclosure, all of six lenses may be formed of plastic.

The optical system configuring the lens module according to the present disclosure may satisfy Conditional Equation 1.

$$0.6<f1/f<1.2 \qquad \text{[Conditional Equation 1]}$$

Here, f is an overall focal length [mm] of the optical system, and f1 is a focal length [mm] of the first lens.

Conditional Equation 1, a numerical range limiting a ratio of the focal length of the first lens to the overall focal length of the optical system, may be used as a design reference of the first lens. That is, when the ratio of the focal length of the first lens to the overall focal length of the optical system is larger than an upper limit of Conditional Equation 1, refractive power of the first lens may be weak, such that it may be difficult to miniaturize the lens module, and when the ratio of the focal length of the first lens to the overall focal length of the optical system is smaller than a lower limit of Conditional Equation 1, refractive power of the first lens may be excessively strong, such that it is difficult to correct spherical aberrations.

The optical system configuring the lens module according to the present disclosure may satisfy Conditional Equation 2.

$$|v2-v3|>25.0 \qquad \text{[Conditional Equation 2]}$$

Here, v2 is an abbe number of the second lens, and v3 is an abbe number of the third lens.

Conditional Equation 2 may be a numerical range limiting characteristics (that is, abbe numbers) of materials of the second and third lenses. A material satisfying Conditional Equation 2 needs to be used in order to significantly decrease chromatic aberration.

The optical system configuring the lens module according to the present disclosure may satisfy Conditional Equation 3.

$$0.8<f2/f<1.4 \qquad \text{[Conditional Equation 3]}$$

Here, f2 is a focal length [mm] of the second lens, and f is the overall focal length [mm] of the optical system.

Conditional Equation 3, a numerical range limiting a ratio of the focal length of the second lens to the overall focal length of the optical system, may be used as a design reference of the second lens. That is, in the case in which the numerical range of Conditional Equation 3 is satisfied, the second lens may be maintained at appropriate refractive power, thereby correcting a phenomenon that the refractive power of the first lens becomes excessively large.

The optical system configuring the lens module according to the present disclosure may satisfy Conditional Equation 4.

$$0.5<|f3/f|<1.1 \qquad \text{[Conditional Equation 4]}$$

Here, f3 is a focal length [mm] of the third lens, and f is the overall focal length [mm] of the optical system.

Conditional Equation 4, a numerical range limiting a ratio of the focal length of the third lens to the overall focal length of the optical system, may be used as a design reference of the third lens. That is, in the case in which the numerical range of Conditional Equation 4 is satisfied, the third lens may perform aberration correction while being maintained at appropriate refractive power.

The optical system configuring the lens module according to the present disclosure may satisfy Conditional Equation 5.

$$f4/f<-10.0 \qquad \text{[Conditional Equation 5]}$$

Here, f4 is a focal length [mm] of the fourth lens, and f is the overall focal length [mm] of the optical system.

Conditional Equation 5, a numerical range limiting a ratio of the focal length of the fourth lens to the overall focal length of the optical system, may be used as a design reference of the fourth lens. That is, a fourth lens that is out of the numerical range of Conditional Equation 5 may have excessively large negative refractive power, such that it is difficult to correct aberration.

The optical system configuring the lens module according to the present disclosure may satisfy Conditional Equation 6.

$$f5/f<-5.0 \qquad \text{[Conditional Equation 6]}$$

Here, f5 is a focal length [mm] of the fifth lens, and f is the overall focal length [mm] of the optical system.

Conditional Equation 6, a numerical range limiting a ratio of the focal length of the fifth lens to the overall focal length of the optical system, may be used as a design reference of the fifth lens. That is, a fifth lens that is out of the numerical range of Conditional Equation 6 may have excessively large negative refractive power, such that it is difficult to correct aberration.

The optical system configuring the lens module according to the present disclosure may satisfy Conditional Equation 7.

$$|f6/f|>3.0 \qquad \text{[Conditional Equation 7]}$$

Here, f6 is a focal length [mm] of the sixth lens, and f is the overall focal length [mm] of the optical system.

Conditional Equation 7, a numerical range limiting a ratio of the focal length of the sixth lens to the overall focal length of the optical system, may be used as a design reference of the sixth lens. That is, a sixth lens that is out of the numerical range of Conditional Equation 7 has refractive power smaller than appropriate refractive power, such that distortion correction and telecentric characteristics may be deteriorated.

The optical system configuring the lens module according to the present disclosure may satisfy Conditional Equation 8.

$$OAL/f<1.4 \qquad \text{[Conditional Equation 8]}$$

Here, OAL is a distance [mm] from an object-side surface of the first lens to an image surface, and f is the overall focal length [mm] of the optical system.

Conditional Equation 8 may be a ratio of an overall length of the optical system to the overall focal length of the optical system and may be one condition for accomplishing miniaturization of the lens module. That is, a lens module that is outside of a numerical range of Conditional Equation 8 may be advantage for secure performance, but it is difficult to satisfy a demand for miniaturization.

The optical system configuring the lens module according to the present disclosure may satisfy Conditional Equation 9.

$$0.4<f1/f2<1.1 \qquad \text{[Conditional Equation 9]}$$

Here, f1 is the focal length [mm] of the first lens, and f2 is the focal length [mm] of the second lens.

Conditional Equation 9 may be a ratio of the focal length of the first lens to the focal length of the second lens and may be one condition for selecting an optimized combination between the first and second lenses. That is, in a combination between first and second lenses that is outside of a numerical range of Conditional Equation 9, refractive power may be excessively concentrated on the first lens or the second lens.

The optical system configuring the lens module according to the present disclosure may satisfy Conditional Equation 10.

$$|f2/f3|<1.5 \qquad \text{[Conditional Equation 10]}$$

Here, f2 is the focal length [mm] of the second lens, and f3 is the focal length [mm] of the third lens.

Conditional Equation 10 may be a ratio of the focal length of the second lens to the focal length of the third lens and may be used as a design reference of the third lens. That is, a third lens that is outside of a numerical range of Conditional Equation 10 may have excessively large negative refractive power, such that an aberration correction effect is decreased.

The optical system configuring the lens module according to the present disclosure may satisfy Conditional Equation 11.

$$BFL/f>0.25 \qquad \text{[Conditional Equation 11]}$$

Here, BFL is a distance [mm] from an image-side surface of the sixth lens to the image surface, and f is the overall focal length [mm] of the optical system.

Conditional Equation 11 may be a ratio of BFL to the overall focal length of the optical system and may be one condition for smoothly manufacturing the lens module. That is, in a lens module that is outside of a numerical range of Conditional Equation 11, it may be difficult to secure a sufficient space between a lens and an image surface, such that it may be difficult to substantially manufacture the lens module.

The optical system configuring the lens module according to the present disclosure may satisfy Conditional Equation 12.

$$D1/f<0.5 \quad \text{[Conditional Equation 12]}$$

Here, D1 is an air gap [mm] between the first and second lenses, and f is the overall focal length [mm] of the optical system.

Conditional Equation 12 may be a ratio of D1 to the overall focal length of the optical system and may be one condition for improving longitudinal chromatic aberration. That is, a lens module that is out of a range of Conditional Equation 12 may have low longitudinal chromatic aberration characteristics.

The optical system configuring the lens module according to the present disclosure may satisfy Conditional Equation 13.

$$r1/f>0.5 \quad \text{[Conditional Equation 13]}$$

Here, r1 is a radius of curvature [mm] of the object-side surface of the first lens, and f is the overall focal length [mm] of the optical system.

Conditional Equation 13 may be a ratio of the curvature of the object-side surface of the first lens to the overall focal length of the optical system and may be one condition for optimizing a design of the first lens. That is, a first lens that is outside of a numerical range of Conditional Equation 13 may have a small curvature, such that the first lens may be sensitive to a tolerance and it may be difficult for the first lens to be precisely manufactured.

The optical system configuring the lens module according to the present disclosure may satisfy Conditional Equation 14.

$$|r4/f|<1.0 \quad \text{[Conditional Equation 14]}$$

Here, r4 is a radius of curvature [mm] of an image-side surface of the second lens, and f is the overall focal length [mm] of the optical system.

Conditional Equation 14 may be a ratio of the curvature of the image-side surface of the second lens to the overall focal length of the optical system and may be one condition for optimizing a design of the second lens. That is, a second lens satisfying a numerical range of Conditional Equation 14 may have positive refractive power having an appropriate magnitude.

Next, the first to sixth lenses configuring the optical system will be described.

The first lens may have positive refractive power. In addition, both surfaces of the first lens may be convex. For example, a first surface of the first lens may be convex toward an object, and a second surface thereof may be convex. At least one of the first and second surfaces of the first lens may be aspherical. For example, both of the first and second surfaces of the first lens may be aspherical.

The second lens may have positive refractive power. In addition, a second surface of the second lens may be convex toward the image, and a first surface thereof may be concave or may be convex toward the object. That is, the first surface of the second lens is not limited to having a specific shape. At least one of the first and second surfaces of the second lens may be aspherical. For example, both surfaces of the second lens may be aspherical.

The third lens may have negative refractive power. In addition, a first surface of the third lens may be concave. Unlike this, a second surface of the third lens may be concave or convex. At least one of the first and second surfaces of the third lens may be aspherical. For example, both surfaces of the third lens may be aspherical.

The fourth lens may have negative refractive power. In addition, the fourth lens may have a meniscus shape, convex toward the image. In detail, a first surface of the fourth lens may be concave, and a second surface thereof may be convex toward the image. At least one of the first and second surfaces of the fourth lens may be aspherical. For example, both surfaces of the fourth lens may be aspherical.

The fifth lens may have negative refractive power. In addition, a first of the second lens 20 may be convex toward the object, and a second surface thereof may be concave. In addition, the fifth lens may have an inflection point formed on at least one of the first and second surfaces thereof. The fifth lens having the above-mentioned shape may be advantageous for concentrating light refracted from the fourth lens on the sixth lens. At least one of the first and second surfaces of the fifth lens may be aspherical. For example, both surfaces of the fifth lens may be aspherical.

The sixth lens may have positive or negative refractive power. That is, the sixth lens may have the positive refractive power or the negative refractive power. Here, the refractive power of the sixth lens may be changed depending on shapes of the second and third lenses. For example, when both of the first surface of the second lens and the first surface of the third lens are convex toward the object, the sixth lens may have the positive refractive power. However, refractive power of the sixth lens is not limited to the above-mentioned condition. For example, even in the case in which both of the first surface of the second lens and the first surface of the third lens are convex toward the object, the sixth lens may have the negative refractive power. A first surface of the sixth lens may be convex and a second surface thereof may be concave. In addition, the sixth lens may have an inflection point formed on at least one of the first and second surfaces thereof. For example, the second surface of the sixth lens may be concave at the center of an optical axis and become convex toward an edge thereof. In addition, at least one of the first and second surfaces of the sixth lens may be aspherical. For example, both surfaces of the sixth lens may be aspherical.

In the lens module configured as described above, a plurality of lenses perform an aberration correction function, whereby aberration improvement performance may be improved. In addition, the lens module may improve sensitivity of the lens by decreasing a refraction angle of the optical system. Therefore, in the optical system of the lens module, all of the lenses may be formed of plastic having optical performance lower than that of glass, whereby a cost required for manufacturing the lens module may be decreased and manufacturing efficiency of the lens module may be increased.

A lens module according to a first exemplary embodiment of the present disclosure will be described with reference to FIG. 1.

A lens module 100 according to a first exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (OAL) from a first surface of the first lens 10 to a first surface (image surface) of the image sensor 80 may be 6.47 mm, and a distance (BFL) from an image-side surface of the sixth lens 60 to the image surface may be 1.40544 mm. In addition, a focal length of the first lens 10 may be 3.83405 mm, a focal length of the second lens 20 may be 6.24201 mm, a focal length of the third lens 30 may be −4.62881 mm, a focal length of the fourth lens 40 may be −246.53 mm, a focal length of the fifth lens 50 may be −167.191 mm, a focal length of the sixth lens 60 may be −23.4865 mm, an overall focal length of the optical system may be 4.92889 mm.

Other characteristics of lenses (radii of curvature of lenses, thicknesses of lenses, distances between lenses, refractive indices of lenses, abbe numbers of lenses) are shown in Table 1.

TABLE 1

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.9554 | 0.646 | 1.547 | 56.1 |
| 3 | −6.6437 | 0.131 | | |
| 4 | −9.0714 | 0.450 | 1.547 | 56.1 |
| 5 | −2.5254 | 0.100 | | |
| 6 | −2.5086 | 0.470 | 1.620 | 25.6 |
| 7 | −21.3799 | 0.589 | | |
| 8 | −1.6520 | 0.792 | 1.547 | 56.1 |
| 9 | −1.9559 | 0.100 | | |
| 10 | 4.5230 | 0.545 | 1.547 | 56.1 |
| 11 | 4.1263 | 0.314 | | |
| 12 | 2.2566 | 0.927 | 1.547 | 56.1 |
| 13 | 1.6405 | 0.355 | | |
| 14 | Infinity | 0.300 | 1.519 | 64.2 |
| 15 | Infinity | 0.750 | | |
| Image | Infinity | 0.000 | | |

In a first exemplary embodiment, the first lens 10 may have positive refractive power, and both surfaces thereof may be convex. The second lens 20 may have positive refractive power, and a first surface thereof may be concave and a second surface thereof may be convex. The third lens 30 may have negative refractive power, and a first surface thereof may be concave and a second surface thereof may be convex. The fourth lens 40 may have negative refractive power and may have a meniscus shape, convex toward the image. The fifth lens 50 may have negative refractive power, and a first surface thereof may be convex and a second surface thereof may be concave. The sixth lens 60 may have negative refractive power, and a first surface thereof may be convex and a second surface thereof may be concave. In addition, the sixth lens 60 may have inflection points formed on the first and second surfaces thereof, respectively. The stop ST may be disposed in front of the first lens 10.

Meanwhile, the respective surfaces of the first to sixth lenses 10 to 60 may have aspherical constants as shown in Table 2. That is, all of the second surfaces of the first to sixth lenses 10 to 60 may be aspherical.

A lens module according to a second exemplary embodiment of the present disclosure will be described with reference to FIG. 2.

A lens module 100 according to a second exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (OAL) from a first surface of the first lens 10 to a first surface (image surface) of the image sensor 80 may be 6.13631 mm, and a distance (BFL) from an image-side surface of the sixth lens 60 to the image surface may be 1.37419 mm. In addition, a focal length of the first lens 10 may be 3.87821 mm, a focal length of the second lens 20 may be 5.67618 mm, a focal length of the third lens 30 may be −4.39148 mm, a focal length of the fourth lens 40 may be −14801.1 mm, a focal length of the fifth lens 50 may be −102611 mm, a focal length of the sixth lens 60 may be −36.7602 mm, an overall focal length of the optical system may be 4.54624 mm.

Other characteristics of lenses (radii of curvature of lenses, thicknesses of lenses, distances between lenses, refractive indices of lenses, abbe numbers of lenses) are shown in Table 3.

TABLE 3

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.8893 | 0.625 | 1.547 | 56.1 |
| 3 | −7.3470 | 0.107 | | |
| 4 | −10.5861 | 0.473 | 1.547 | 56.1 |
| 5 | −2.4370 | 0.100 | | |
| 6 | −2.4570 | 0.412 | 1.620 | 25.6 |
| 7 | −26.8284 | 0.611 | | |
| 8 | −1.6147 | 0.758 | 1.547 | 56.1 |
| 9 | −1.8828 | 0.100 | | |
| 10 | 3.4703 | 0.585 | 1.547 | 56.1 |
| 11 | 3.2632 | 0.179 | | |
| 12 | 2.0312 | 0.813 | 1.547 | 56.1 |
| 13 | 1.5838 | 0.324 | | |
| 14 | Infinity | 0.300 | 1.519 | 64.2 |
| 15 | Infinity | 0.752 | | |
| Image | Infinity | −0.002 | | |

In a second exemplary embodiment, the first lens 10 may have positive refractive power, and both surfaces thereof may

TABLE 2

| Surface No. | 2 | 3 | 4 | 5 | 6 | 7 | 8 | 9 | 10 | 11 | 12 | 13 |
|---|---|---|---|---|---|---|---|---|---|---|---|---|
| Y radius | 2.955 | −6.644 | −9.071 | −2.525 | −2.509 | −21.380 | −1.652 | −1.956 | 4.523 | 4.126 | 2.257 | 1.640 |
| Conic Constant (K) | 0.000 | 23.230 | 47.597 | −1.309 | 0.000 | 0.000 | −3.936 | 0.542 | −3.671 | −6.912 | −6.461 | −4.343 |
| 4-th Order Coefficient (A) | −0.028 | −0.034 | −0.017 | −0.021 | 0.029 | 0.033 | −0.084 | −0.026 | −0.004 | −0.003 | −0.072 | −0.049 |
| 6-th Order Coefficient (B) | −0.008 | −0.019 | −0.004 | 0.007 | −0.017 | −0.021 | 0.060 | 0.043 | −0.001 | 0.000 | 0.026 | 0.014 |
| 8-th Order Coefficient (C) | −0.042 | −0.031 | −0.027 | −0.016 | 0.012 | 0.011 | −0.020 | −0.016 | 0.000 | 0.000 | −0.006 | −0.003 |
| 10-th Order Coefficient (D) | 0.036 | 0.023 | 0.025 | 0.019 | 0.007 | −0.002 | 0.009 | 0.007 | 0.000 | 0.000 | 0.001 | 0.000 |
| 12-th Order Coefficient (E) | −0.027 | −0.009 | −0.003 | −0.006 | −0.003 | 0.001 | −0.002 | −0.001 | 0.000 | 0.000 | 0.000 | 0.000 |
| 14-th Order Coefficient (F) | 0.000 | 0.000 | 0.000 | 0.000 | 0.000 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 | be convex. The second lens 20 may have positive refractive power, and a first surface thereof may be concave and a second surface thereof may be convex. The third lens 30 may have negative refractive power, and a first surface thereof may be concave and a second surface thereof may be convex. The fourth lens 40 may have negative refractive power and may have a meniscus shape, convex toward the image. The fifth lens 50 may have negative refractive power, and a first surface thereof may be convex and a second surface thereof may be concave. In addition, the fifth lens 50 may have inflection points formed on the first and second surfaces thereof, respectively. The sixth lens 60 may have negative refractive power, and a first surface thereof may be convex and a second surface thereof may be concave. In addition, the sixth lens 60 may have inflection points formed on the first and second surfaces thereof, respectively. The stop ST may be disposed in front of the first lens 10.

Meanwhile, the respective surfaces of the first to sixth lenses 10 to 60 may have aspherical constants as shown in Table 4. That is, all of the second surfaces of the first to sixth lenses 10 to 60 may be aspherical.

TABLE 5

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.7780 | 0.583 | 1.547 | 56.1 |
| 3 | −11.0039 | 0.131 | | |
| 4 | −21.0107 | 0.524 | 1.547 | 56.1 |
| 5 | −2.3483 | 0.100 | | |
| 6 | −2.5353 | 0.300 | 1.639 | 23.4 |
| 7 | 184.8717 | 0.599 | | |
| 8 | −1.5762 | 0.750 | 1.547 | 56.1 |
| 9 | −1.8468 | 0.100 | | |
| 10 | 3.1173 | 0.561 | 1.547 | 56.1 |
| 11 | 2.7635 | 0.256 | | |
| 12 | 1.7873 | 0.717 | 1.547 | 56.1 |
| 13 | 1.5173 | 0.298 | | |
| 14 | Infinity | 0.300 | 1.519 | 64.2 |
| 15 | Infinity | 0.751 | | |
| Image | Infinity | −0.001 | | |

In a third exemplary embodiment, the first lens 10 may have positive refractive power, and both surfaces thereof may be convex. The second lens 20 may have positive refractive

TABLE 4

| Surface No. | 2 | 3 | 4 | 5 | 6 | 7 | 8 | 9 | 10 | 11 | 12 | 13 |
|---|---|---|---|---|---|---|---|---|---|---|---|---|
| Y radius | 2.889 | −7.347 | −10.586 | −2.437 | −2.457 | −26.828 | −1.615 | −1.883 | 3.470 | 3.263 | 2.031 | 1.584 |
| Conic Constant (K) | 0.000 | 22.826 | 48.822 | −1.217 | 0.000 | 0.000 | −4.365 | −0.566 | −4.491 | −5.958 | −6.787 | −4.677 |
| 4-th Order Coefficient (A) | −0.027 | −0.033 | −0.017 | −0.021 | 0.029 | 0.033 | −0.083 | −0.026 | −0.006 | −0.003 | −0.073 | −0.050 |
| 6-th Order Coefficient (B) | −0.008 | −0.019 | −0.004 | 0.008 | −0.018 | −0.021 | 0.061 | 0.044 | −0.001 | −0.001 | 0.026 | 0.014 |
| 8-th Order Coefficient (C) | −0.042 | −0.032 | −0.026 | −0.015 | 0.012 | 0.011 | −0.020 | −0.015 | 0.000 | 0.000 | −0.006 | −0.003 |
| 10-th Order Coefficient (D) | 0.035 | 0.022 | 0.026 | 0.019 | 0.007 | −0.002 | 0.009 | 0.007 | 0.000 | 0.000 | 0.001 | 0.000 |
| 12-th Order Coefficient (E) | −0.026 | −0.008 | −0.004 | −0.005 | −0.003 | 0.001 | −0.002 | −0.001 | 0.000 | 0.000 | 0.000 | 0.000 |
| 14-th Order Coefficient (F) | 0.000 | 0.000 | 0.000 | 0.000 | 0.000 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

A lens module according to a third exemplary embodiment of the present disclosure will be described with reference to FIG. 3.

A lens module 100 according to a third exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (OAL) from a first surface of the first lens 10 to a first surface (image surface) of the image sensor 80 may be 5.97 mm, and a distance (BFL) from an image-sided surface of the sixth lens 60 to the image surface may be 1.34815 mm. In addition, a focal length of the first lens 10 may be 4.12028 mm, a focal length of the second lens 20 may be 4.79021 mm, a focal length of the third lens 30 may be −4.03214 mm, a focal length of the fourth lens 40 may be −945.217 mm, a focal length of the fifth lens 50 may be −100 mm, a focal length of the sixth lens 60 may be −296.23 mm, an overall focal length of the optical system may be 4.44431 mm.

Other characteristics of lenses (radii of curvature of lenses, thicknesses of lenses, distances between lenses, refractive indices of lenses, abbe numbers of lenses) are shown in Table 5.

power, and a first surface thereof may be concave and a second surface thereof may be convex. The third lens 30 may have negative refractive power, and both surfaces thereof may be concave. The fourth lens 40 may have negative refractive power and may have a meniscus shape, convex toward the image. The fifth lens 50 may have negative refractive power, and a first surface thereof may be convex and a second surface thereof may be concave. In addition, the fifth lens 50 may have inflection points formed on the first and second surfaces thereof, respectively. The sixth lens 60 may have negative refractive power, and a first surface thereof may be convex and a second surface thereof may be concave. In addition, the sixth lens 60 may have inflection points formed on the first and second surfaces thereof, respectively. The stop ST may be disposed in front of the first lens 10.

Meanwhile, the respective surfaces of the first to sixth lenses 10 to 60 may have aspherical constants as shown in Table 6. That is, all of the second surfaces of the first to sixth lenses 10 to 60 may be aspherical.

TABLE 6

| Surface No. | 2 | 3 | 4 | 5 | 6 | 7 | 8 | 9 | 10 | 11 | 12 | 13 |
|---|---|---|---|---|---|---|---|---|---|---|---|---|
| Y radius | 2.778 | −11.004 | −21.011 | −2.348 | −2.535 | 184.872 | −1.576 | −1.847 | 3.117 | 2.764 | 1.787 | 1.517 |
| Conic Constant (K) | 0.000 | 22.038 | 62.069 | −1.120 | 0.000 | 0.000 | −4.230 | −0.608 | −8.021 | −10.397 | −6.307 | −4.780 |
| 4-th Order Coefficient (A) | −0.027 | −0.034 | −0.017 | −0.022 | 0.027 | 0.034 | −0.081 | −0.025 | −0.005 | −0.004 | −0.081 | −0.055 |
| 6-th Order Coefficient (B) | −0.006 | −0.018 | −0.005 | 0.008 | −0.018 | −0.022 | 0.062 | 0.045 | −0.001 | −0.001 | 0.027 | 0.014 |
| 8-th Order Coefficient (C) | −0.043 | −0.032 | −0.026 | −0.016 | 0.013 | 0.012 | −0.019 | −0.015 | 0.000 | 0.000 | −0.006 | −0.003 |
| 10-th Order Coefficient (D) | 0.035 | 0.022 | 0.026 | 0.014 | 0.008 | −0.001 | 0.010 | 0.007 | 0.000 | 0.000 | 0.001 | 0.000 |
| 12-th Order Coefficient (E) | −0.023 | −0.008 | 0.004 | −0.005 | −0.004 | 0.001 | −0.001 | −0.001 | 0.000 | 0.000 | 0.000 | 0.000 |
| 14-th Order Coefficient (F) | 0.000 | 0.000 | 0.000 | 0.000 | 0.000 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

A lens module according to a fourth exemplary embodiment of the present disclosure will be described with reference to FIG. 4.

A lens module 100 according to a fourth exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (OAL) from a first surface of the first lens 10 to a first surface (image surface) of the image sensor 80 may be 5.97 mm, and a distance (BFL) from an image-side surface of the sixth lens 60 to the image surface may be 1.32475 mm. In addition, a focal length of the first lens 10 may be 4.17469 mm, a focal length of the second lens 20 may be 4.68306 mm, a focal length of the third lens 30 may be −3.88701 mm, a focal length of the fourth lens 40 may be −10000 mm, a focal length of the fifth lens 50 may be −47.1707 mm, a focal length of the sixth lens 60 may be −10000 mm, an overall focal length of the optical system may be 4.54564 mm.

Other characteristics of lenses (radii of curvature of lenses, thicknesses of lenses, distances between lenses, refractive indices of lenses, abbe numbers of lenses) are shown in Table 7.

TABLE 7

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.7124 | 0.557 | 1.547 | 56.1 |
| 3 | −13.3170 | 0.138 | | |
| 4 | −61.9251 | 0.528 | 1.547 | 56.1 |
| 5 | −2.4651 | 0.100 | | |
| 6 | −2.8255 | 0.300 | 1.639 | 23.4 |
| 7 | 17.0342 | 0.592 | | |
| 8 | −1.5996 | 0.750 | 1.547 | 56.1 |
| 9 | −1.8652 | 0.100 | | |
| 10 | 3.0431 | 0.568 | 1.639 | 23.4 |
| 11 | 2.5596 | 0.325 | | |
| 12 | 1.7117 | 0.689 | 1.547 | 56.1 |
| 13 | 1.4679 | 0.275 | | |
| 14 | Infinity | 0.300 | 1.519 | 64.2 |
| 15 | Infinity | 0.746 | | |
| Image | Infinity | 0.004 | | |

In a fourth exemplary embodiment, the first lens 10 may have positive refractive power, and both surfaces thereof may be convex. The second lens 20 may have positive refractive power, and a first surface thereof may be concave and a second surface thereof may be convex. The third lens 30 may have negative refractive power, and both surfaces thereof may be concave. The fourth lens 40 may have negative refractive power and may have a meniscus shape, convex toward the image. The fifth lens 50 may have negative refractive power, and a first surface thereof may be convex and a second surface thereof may be concave. In addition, the fifth lens 50 may have inflection points formed on the first and second surfaces thereof, respectively. The sixth lens 60 may have negative refractive power, and a first surface thereof may be convex and a second surface thereof may be concave. In addition, the sixth lens 60 may have inflection points formed on the first and second surfaces thereof, respectively. The stop ST may be disposed in front of the first lens 10.

Meanwhile, the respective surfaces of the first to sixth lenses 10 to 60 may have aspherical constants as shown in Table 8. That is, all of the second surfaces of the first to sixth lenses 10 to 60 may be aspherical.

TABLE 8

| Surface No. | 2 | 3 | 4 | 5 | 6 | 7 | 8 | 9 | 10 | 11 | 12 | 13 |
|---|---|---|---|---|---|---|---|---|---|---|---|---|
| Y radius | 2.712 | −13.317 | −61.925 | −2.465 | −2.825 | 17.034 | −1.600 | −1.865 | 3.043 | 2.560 | 1.712 | 1.468 |
| Conic Constant (K) | 0.000 | 16.517 | 0.000 | −1.058 | 0.000 | 0.000 | −4.167 | −0.653 | −13.297 | −15.397 | −7.098 | −5.199 |
| 4-th Order Coefficient (A) | −0.027 | −0.033 | −0.019 | −0.023 | 0.026 | 0.035 | −0.079 | −0.024 | 0.000 | −0.004 | −0.088 | −0.057 |
| 6-th Order Coefficient (B) | −0.006 | −0.018 | −0.006 | 0.008 | −0.017 | −0.022 | 0.063 | 0.045 | −0.001 | −0.001 | 0.027 | 0.013 |
| 8-th Order Coefficient (C) | −0.044 | −0.032 | −0.026 | −0.015 | 0.013 | 0.013 | −0.019 | −0.015 | 0.000 | 0.000 | −0.006 | −0.003 |
| 10-th Order Coefficient (D) | 0.033 | 0.022 | 0.026 | 0.018 | 0.008 | 0.000 | 0.010 | 0.007 | 0.000 | 0.000 | 0.001 | 0.000 |
| 12-th Order Coefficient (E) | −0.022 | −0.008 | −0.005 | −0.006 | −0.004 | 0.002 | −0.001 | −0.001 | 0.000 | 0.000 | 0.000 | 0.000 |
| 14-th Order Coefficient (F) | 0.000 | 0.000 | 0.000 | 0.000 | 0.000 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

A lens module according to a fifth exemplary embodiment of the present disclosure will be described with reference to FIG. 5.

A lens module 100 according to a fifth exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (OAL) from a first surface of the first lens 10 to a first surface (image surface) of the image sensor 80 may be 5.77 mm, and a distance (BFL) from an image-side surface of the sixth lens 60 to the image surface may be 1.28007 mm. In addition, a focal length of the first lens 10 may be 4.1856 mm, a focal length of the second lens 20 may be 4.8193 mm, a focal length of the third lens 30 may be −3.67059 mm, a focal length of the fourth lens 40 may be −9999.83 mm, a focal length of the fifth lens 50 may be −97.54 mm, a focal length of the sixth lens 60 may be −136.498 mm, an overall focal length of the optical system may be 4.55696 mm.

Other characteristics of lenses (radii of curvature of lenses, thicknesses of lenses, distances between lenses, refractive indices of lenses, abbe numbers of lenses) are shown in Table 9.

TABLE 9

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.5516 | 0.531 | 1.547 | 56.1 |
| 3 | −20.4660 | 0.166 | | |
| 4 | 162.7380 | 0.527 | 1.547 | 56.1 |
| 5 | −2.6740 | 0.100 | | |
| 6 | −3.1599 | 0.300 | 1.639 | 23.4 |
| 7 | 8.4243 | 0.690 | | |
| 8 | −1.5369 | 0.514 | 1.547 | 56.1 |
| 9 | −1.7191 | 0.100 | | |
| 10 | 3.3865 | 0.665 | 1.639 | 23.4 |
| 11 | 2.9659 | 0.316 | | |
| 12 | 1.5391 | 0.580 | 1.547 | 56.1 |
| 13 | 1.3070 | 0.280 | | |
| 14 | Infinity | 0.300 | 1.519 | 64.2 |
| 15 | Infinity | 0.696 | | |
| Image | Infinity | 0.004 | | |

In a fifth exemplary embodiment, the first lens 10 may have positive refractive power, and both surfaces thereof may be convex. The second lens 20 may have positive refractive power, and a first surface thereof may be convex and a second surface thereof may be convex. The third lens 30 may have negative refractive power, and both surfaces thereof may be concave. The fourth lens 40 may have negative refractive power and may have a meniscus shape, convex toward the image. The fifth lens 50 may have negative refractive power, and a first surface thereof may be convex and a second surface thereof may be concave. In addition, the fifth lens 50 may have inflection points formed on the first and second surfaces thereof, respectively. The sixth lens 60 may have negative refractive power, and a first surface thereof may be convex and a second surface thereof may be concave. In addition, the sixth lens 60 may have inflection points formed on the first and second surfaces thereof, respectively. The stop ST may be disposed in front of the first lens 10.

Meanwhile, the respective surfaces of the first to sixth lenses 10 to 60 may have aspherical constants as shown in Table 10. That is, all of the second surfaces of the first to sixth lenses 10 to 60 may be aspherical.

TABLE 10

| Surface No. | 2 | 3 | 4 | 5 | 6 | 7 | 8 | 9 | 10 | 11 | 12 | 13 |
|---|---|---|---|---|---|---|---|---|---|---|---|---|
| Y radius | 2.552 | −20.466 | 162.738 | −2.674 | −3.160 | 8.424 | −1.537 | −1.719 | 3.387 | 2.966 | 1.539 | 1.307 |
| Conic Constant (K) | 0.000 | 56.736 | 0.000 | −0.907 | 0.000 | 0.000 | −4.607 | −0.817 | −27.087 | −43.320 | −9.150 | −5.584 |
| 4-th Order Coefficient (A) | −0.028 | −0.035 | −0.021 | −0.024 | 0.022 | 0.042 | −0.075 | −0.020 | −0.004 | −0.016 | −0.102 | −0.058 |
| 6-th Order Coefficient (B) | −0.005 | −0.015 | −0.004 | 0.006 | −0.016 | −0.020 | 0.065 | 0.047 | −0.002 | 0.000 | 0.028 | 0.014 |
| 8-th Order Coefficient (C) | −0.044 | −0.032 | −0.026 | −0.015 | 0.014 | 0.014 | −0.019 | −0.015 | 0.000 | 0.000 | −0.006 | −0.003 |
| 10-th Order Coefficient (D) | 0.032 | 0.021 | 0.025 | 0.017 | 0.008 | 0.000 | 0.009 | 0.007 | 0.000 | 0.000 | 0.001 | 0.000 |
| 12-th Order Coefficient (E) | −0.020 | −0.009 | −0.007 | −0.007 | −0.005 | 0.001 | −0.001 | −0.001 | 0.000 | 0.000 | 0.000 | 0.000 |
| 14-th Order Coefficient (F) | 0.000 | 0.000 | 0.000 | 0.000 | 0.000 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

A lens module according to a sixth exemplary embodiment of the present disclosure will be described with reference to FIG. 6.

A lens module 100 according to a sixth exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (OAL) from a first surface of the first lens 10 to a first surface (image surface) of the image sensor 80 may be 5.57004 mm, and a distance (BFL) from an image-side surface of the sixth lens 60 to the image surface may be 1.26292 mm. In addition, a focal length of the first lens 10 may be 4.38458 mm, a focal length of the second lens 20 may be 4.93123 mm, a focal length of the third lens 30 may be −3.85963 mm, a focal length of the fourth lens 40 may be −124.684 mm, a focal length of the fifth lens 50 may be −118.157 mm, a focal length of the sixth lens 60 may be 5533.53 mm, an overall focal length of the optical system may be 4.46104 mm.

Other characteristics of lenses (radii of curvature of lenses, thicknesses of lenses, distances between lenses, refractive indices of lenses, abbe numbers of lenses) are shown in Table 11.

TABLE 11

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.4716 | 0.525 | 1.547 | 56.1 |
| 3 | −72.6523 | 0.139 | | |

TABLE 11-continued

| Surface No. | Radius of Curvature | Thickness or Distance | Refractive Index | Abbe Number |
|---|---|---|---|---|
| 4 | 37.6270 | 0.540 | 1.547 | 56.1 |
| 5 | −2.8881 | 0.100 | | |
| 6 | −4.3080 | 0.300 | 1.639 | 23.4 |
| 7 | 5.5246 | 0.710 | | |
| 8 | −1.3698 | 0.344 | 1.547 | 56.1 |
| 9 | −1.5219 | 0.100 | | |
| 10 | 3.3499 | 0.703 | 1.639 | 23.4 |
| 11 | 2.9463 | 0.290 | | |
| 12 | 1.4652 | 0.557 | 1.547 | 56.1 |
| 13 | 1.2690 | 0.263 | | |
| 14 | Infinity | 0.300 | 1.519 | 64.2 |
| 15 | Infinity | 0.697 | | |
| Image | Infinity | 0.003 | | |

In a sixth exemplary embodiment, the first lens 10 may have positive refractive power, and both surfaces thereof may be convex. The second lens 20 may have positive refractive power, and a first surface thereof may be convex and a second surface thereof may be convex. The third lens 30 may have negative refractive power, and both surfaces thereof may be concave. The fourth lens 40 may have negative refractive power and may have a meniscus shape, convex toward the image. The fifth lens 50 may have negative refractive power, and a first surface thereof may be convex and a second surface thereof may be concave. In addition, the fifth lens 50 may have inflection points formed on the first and second surfaces thereof, respectively. The sixth lens 60 may have positive refractive power, and a first surface thereof may be convex and a second surface thereof may be concave. In addition, the sixth lens 60 may have inflection points formed on the first and second surfaces thereof, respectively. The stop ST may be disposed in front of the first lens 10.

Meanwhile, the respective surfaces of the first to sixth lenses 10 to 60 may have aspherical constants as shown in Table 12. That is, all of the second surfaces of the first to sixth lenses 10 to 60 may be aspherical.

TABLE 12

| Surface No. | 2 | 3 | 4 | 5 | 6 | 7 | 8 | 9 | 10 | 11 | 12 | 13 |
|---|---|---|---|---|---|---|---|---|---|---|---|---|
| Y radius | 2.472 | −72.652 | 37.627 | −2.888 | −4.308 | 5.525 | −1.370 | −1.522 | 3.350 | 2.946 | 1.465 | 1.269 |
| Conic Constant (K) | 0.000 | 0.000 | 0.000 | −0.026 | 0.000 | 0.000 | −4.285 | −0.966 | −30.498 | −49.344 | −9.606 | −5.915 |
| 4-th Order Coefficient (A) | −0.028 | −0.044 | −0.036 | −0.029 | 0.012 | 0.043 | −0.071 | −0.015 | −0.011 | −0.023 | −0.113 | −0.062 |
| 6-th Order Coefficient (B) | −0.005 | −0.007 | 0.002 | 0.002 | −0.018 | −0.017 | 0.069 | 0.047 | −0.001 | 0.000 | 0.027 | 0.014 |
| 8-th Order Coefficient (C) | −0.039 | −0.028 | −0.026 | −0.016 | 0.014 | 0.014 | −0.019 | −0.015 | −0.001 | 0.000 | −0.006 | −0.003 |
| 10-th Order Coefficient (D) | 0.027 | 0.021 | 0.025 | 0.016 | 0.009 | 0.000 | 0.008 | 0.008 | 0.000 | 0.000 | 0.001 | 0.000 |
| 12-th Order Coefficient (E) | −0.015 | −0.008 | −0.009 | −0.006 | −0.005 | 0.001 | 0.000 | −0.001 | 0.000 | 0.000 | 0.000 | 0.000 |
| 14-th Order Coefficient (F) | 0.000 | 0.000 | 0.000 | 0.000 | 0.000 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

A lens module according to a seventh exemplary embodiment of the present disclosure will be described with reference to FIG. 7.

A lens module 100 according to a seventh exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (OAL) from a first surface of the first lens 10 to a first surface (image surface) of the image sensor 80 may be 5.57 mm, and a distance (BFL) from an image-side surface of the sixth lens 60 to the image surface may be 1.2557 mm. In addition, a focal length of the first lens 10 may be 4.4378 mm, a focal length of the second lens 20 may be 4.90463 mm, a focal length of the third lens 30 may be −3.88095 mm, a focal length of the fourth lens 40 may be −103.585 mm, a focal length of the fifth lens 50 may be −143.554 mm, a focal length of the sixth lens 60 may be 7603.61 mm, an overall focal length of the optical system may be 4.46231 mm.

Other characteristics of lenses (radii of curvature of lenses, thicknesses of lenses, distances between lenses, refractive indices of lenses, abbe numbers of lenses) are shown in Table 13.

TABLE 13

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.4761 | 0.524 | 1.547 | 56.1 |
| 3 | −109.2790 | 0.146 | | |
| 4 | 30.2651 | 0.543 | 1.547 | 56.1 |
| 5 | −2.9222 | 0.100 | | |
| 6 | −4.3774 | 0.300 | 1.639 | 23.4 |
| 7 | 5.4815 | 0.709 | | |
| 8 | −1.3568 | 0.336 | 1.547 | 56.1 |
| 9 | −1.5117 | 0.100 | | |
| 10 | 3.2837 | 0.711 | 1.639 | 23.4 |
| 11 | 2.9044 | 0.292 | | |
| 12 | 1.4783 | 0.554 | 1.547 | 56.1 |
| 13 | 1.2829 | 0.256 | | |
| 14 | Infinity | 0.300 | 1.519 | 64.2 |
| 15 | Infinity | 0.696 | | |
| Image | Infinity | 0.004 | | |

In a seventh exemplary embodiment, the first lens 10 may have positive refractive power, and both surfaces thereof may be convex. The second lens 20 may have positive refractive power, and a first surface thereof may be convex and a second surface thereof may be convex. The third lens 30 may have negative refractive power, and both surfaces thereof may be concave. The fourth lens 40 may have negative refractive power and may have a meniscus shape, convex toward the image. The fifth lens 50 may have negative refractive power, and a first surface thereof may be convex and a second surface thereof may be concave. In addition, the fifth lens 50 may have inflection points formed on the first and second surfaces thereof, respectively. The sixth lens 60 may have positive refractive power, and a first surface thereof may be convex and a second surface thereof may be concave. In addition, the sixth lens 60 may have inflection points formed on the first and second surfaces thereof, respectively. The stop ST may be disposed in front of the first lens 10.

Meanwhile, the respective surfaces of the first to sixth lenses 10 to 60 may have aspherical constants as shown in Table 14. That is, all of the second surfaces of the first to sixth lenses 10 to 60 may be aspherical.

TABLE 14

| Surface No. | 2 | 3 | 4 | 5 | 6 | 7 | 8 | 9 | 10 | 11 | 12 | 13 |
|---|---|---|---|---|---|---|---|---|---|---|---|---|
| Y radius | 2.476 | −109.279 | 30.265 | −2.922 | −4.377 | 5.481 | −1.357 | −1.512 | 3.284 | 2.904 | 1.478 | 1.283 |
| Conic Constant (K) | 0.000 | 0.000 | 0.000 | 0.051 | 0.000 | 0.000 | −4.271 | −0.966 | −30.663 | −48.114 | −9.781 | −6.004 |
| 4-th Order Coefficient (A) | −0.028 | −0.045 | −0.037 | −0.030 | 0.011 | 0.042 | −0.071 | −0.015 | −0.012 | −0.024 | −0.114 | −0.063 |
| 6-th Order Coefficient (B) | −0.005 | −0.007 | 0.002 | 0.002 | −0.019 | −0.017 | 0.069 | 0.047 | −0.002 | 0.000 | 0.027 | 0.014 |
| 8-th Order Coefficient (C) | −0.039 | −0.028 | −0.026 | −0.015 | 0.014 | 0.014 | −0.019 | −0.015 | −0.001 | 0.000 | −0.006 | −0.003 |
| 10-th Order Coefficient (D) | 0.027 | 0.021 | 0.025 | 0.016 | 0.009 | 0.000 | 0.007 | 0.008 | 0.000 | 0.000 | 0.001 | 0.000 |
| 12-th Order Coefficient (E) | −0.015 | −0.008 | −0.009 | −0.006 | −0.005 | 0.001 | 0.000 | −0.001 | 0.000 | 0.000 | 0.000 | 0.000 |
| 14-th Order Coefficient (F) | 0.000 | 0.000 | 0.000 | 0.000 | 0.000 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

A lens module according to an eighth exemplary embodiment of the present disclosure will be described with reference to FIG. 8.

A lens module 100 according to an eighth exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (OAL) from a first surface of the first lens 10 to a first surface (image surface) of the image sensor 80 may be 5.81019 mm, and a distance (BFL) from an image-side surface of the sixth lens 60 to the image surface may be 1.2654 mm. In addition, a focal length of the first lens 10 may be 4.44837 mm, a focal length of the second lens 20 may be 4.89096 mm, a focal length of the third lens 30 may be −3.86231 mm, a focal length of the fourth lens 40 may be −92.1376 mm, a focal length of the fifth lens 50 may be −94.0101 mm, a focal length of the sixth lens 60 may be 5379.35 mm, an overall focal length of the optical system may be 4.64022 mm.

Other characteristics of lenses (radii of curvature of lenses, thicknesses of lenses, distances between lenses, refractive indices of lenses, abbe numbers of lenses) are shown in Table 15.

TABLE 15

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.5690 | 0.527 | 1.547 | 56.1 |
| 3 | −41.9774 | 0.189 | | |
| 4 | 42.5815 | 0.544 | 1.547 | 56.1 |
| 5 | −2.8391 | 0.100 | | |
| 6 | −3.7920 | 0.300 | 1.639 | 23.4 |
| 7 | 6.6921 | 0.733 | | |
| 8 | −1.4025 | 0.399 | 1.547 | 56.1 |
| 9 | −1.5877 | 0.100 | | |
| 10 | 3.5296 | 0.815 | 1.639 | 23.4 |
| 11 | 3.0339 | 0.299 | | |
| 12 | 1.4924 | 0.538 | 1.547 | 56.1 |
| 13 | 1.3029 | 0.265 | | |
| 14 | Infinity | 0.300 | 1.519 | 64.2 |
| 15 | Infinity | 0.696 | | |
| Image | Infinity | 0.004 | | |

In an eighth exemplary embodiment, the first lens 10 may have positive refractive power, and both surfaces thereof may be convex. The second lens 20 may have positive refractive power, and a first surface thereof may be convex and a second surface thereof may be convex. The third lens 30 may have negative refractive power, and both surfaces thereof may be concave. The fourth lens 40 may have negative refractive power and may have a meniscus shape, convex toward the image. The fifth lens 50 may have negative refractive power, and a first surface thereof may be convex and a second surface thereof may be concave. In addition, the fifth lens 50 may have inflection points formed on the first and second surfaces thereof, respectively. The sixth lens 60 may have positive refractive power, and a first surface thereof may be convex and a second surface thereof may be concave. In addition, the sixth lens 60 may have inflection points formed on the first and second surfaces thereof, respectively. The stop ST may be disposed in front of the first lens 10.

Meanwhile, the respective surfaces of the first to sixth lenses 10 to 60 may have aspherical constants as shown in Table 16. That is, all of the second surfaces of the first to sixth lenses 10 to 60 may be aspherical.

TABLE 16

| Surface No. | 2 | 3 | 4 | 5 | 6 | 7 | 8 | 9 | 10 | 11 | 12 | 13 |
|---|---|---|---|---|---|---|---|---|---|---|---|---|
| Y radius | 2.569 | −41.977 | 42.581 | −2.839 | −3.792 | 6.692 | −1.402 | −1.588 | 3.530 | 3.034 | 1.492 | 1.303 |
| Conic Constant (K) | 0.000 | 0.000 | 0.000 | −0.110 | 0.000 | 0.000 | −4.289 | −0.953 | −32.881 | −50.081 | −9.319 | −5.876 |
| 4-th Order Coefficient (A) | −0.027 | −0.042 | −0.034 | −0.029 | 0.015 | 0.041 | −0.073 | −0.015 | −0.010 | −0.022 | −0.107 | −0.061 |
| 6-th Order Coefficient (B) | −0.003 | −0.007 | 0.001 | 0.003 | −0.018 | −0.017 | 0.068 | 0.046 | −0.001 | 0.000 | 0.027 | 0.014 |
| 8-th Order Coefficient (C) | −0.039 | −0.028 | −0.026 | −0.015 | 0.014 | 0.013 | −0.020 | −0.015 | −0.001 | 0.000 | −0.006 | −0.003 |
| 10-th Order Coefficient (D) | 0.028 | 0.021 | 0.025 | 0.016 | 0.008 | 0.000 | 0.007 | 0.008 | 0.000 | 0.000 | 0.001 | 0.000 |
| 12-th Order Coefficient (E) | −0.015 | −0.008 | −0.008 | −0.006 | −0.004 | 0.001 | 0.000 | −0.001 | 0.000 | 0.000 | 0.000 | 0.000 |
| 14-th Order Coefficient (F) | 0.000 | 0.000 | 0.000 | 0.000 | 0.000 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

The lens modules according to first to eighth exemplary embodiments of the present disclosure configured as described above may satisfy all of Conditional Equations 1 to 14 as shown in Table 17. Therefore, optical performance of the lenses may be improved.

TABLE 17

| Conditional Equation | First Exemplary Embodiment | Second Exemplary Embodiment | Third Exemplary Embodiment | Fourth Exemplary Embodiment | Fifth Exemplary Embodiment | Sixth Exemplary Embodiment | Seventh Exemplary Embodiment | Eight Exemplary Embodiment |
|---|---|---|---|---|---|---|---|---|
| 0.6 < f1/f < 1.2 | 0.78 | 0.85 | 0.93 | 0.92 | 0.92 | 0.98 | 0.99 | 0.96 |
| \| v2-v3 \| > 25.0 | 30.52 | 30.52 | 30.52 | 30.52 | 30.52 | 30.52 | 30.52 | 30.52 |
| 0.8 < f2/f < 1.4 | 1.27 | 1.25 | 1.08 | 1.03 | 1.06 | 1.11 | 1.10 | 1.05 |
| 0.5 < \| f3/f \| < 1.1 | 0.94 | 0.97 | 0.91 | 0.86 | 0.81 | 0.87 | 0.87 | 0.83 |
| f4/f < −10.0 | −50.02 | −3255.68 | −212.68 | −2199.91 | −2194A1 | −27.95 | −23.21 | −19.86 |
| f5/1 < −5.0 | −33.92 | −22570.52 | −22.50 | −10.38 | −21.40 | −26.49 | −32.17 | −20.26 |
| \| f6/f \| > 30 | 4.77 | 8.09 | 66.65 | 2199.91 | 29.95 | 1240.41 | 1703.96 | 1159.29 |
| OAL/f < 1.4 | 1.31 | 1.35 | 1.34 | 1.31 | 1.27 | 1.25 | 1.25 | 1.25 |
| 0.4 < f1/f2 < 1.1 | 0.61 | 0.68 | 0.86 | 0.89 | 0.87 | 0.89 | 0.90 | 0.91 |
| \| f2/f3 \| < 1.5 | 1.35 | 1.29 | 1.19 | 1.20 | 1.31 | 1.28 | 1.26 | 1.27 |
| BFL/f > 0.25 | 0.29 | 0.30 | 0.30 | 0.29 | 0.28 | 0.28 | 0.28 | 0.27 |
| D1/f < 0.5 | 0.03 | 0.02 | 0.03 | 0.03 | 0.04 | 0.03 | 0.03 | 0.04 |
| r1/f > 0.5 | 0.60 | 0.64 | 0.63 | 0.60 | 0.56 | 0.55 | 0.55 | 0.55 |
| \| r4/f \| < 1.0 | 0.51 | 0.54 | 0.53 | 0.54 | 0.59 | 0.65 | 0.65 | 0.61 |

As set forth above, according to exemplary embodiments of the present disclosure, aberration may be easily corrected and high resolution may be implemented.

Further, according to exemplary embodiments of the present disclosure, since an optical system may be configured only using plastic lenses, the optical system may have a light weight and a cost required for manufacturing the lens module may be decreased.

While exemplary embodiments have been shown and described above, it will be apparent to those skilled in the art that modifications and variations could be made without departing from the spirit and scope of the present disclosure as defined by the appended claims.

What is claimed is:

1. A lens module comprising, in order from an object side to an image side:
   a first lens having positive refractive power;
   a second lens having positive refractive power;
   a third lens having refractive power;
   a fourth lens having negative refractive power;
   a fifth lens having negative refractive power and of which an object-side surface is convex; and
   a sixth lens having an inflection point formed on an image-side surface or an object-side surface thereof.

2. The lens module of claim 1, wherein the first to sixth lens are formed of plastic.

3. The lens module of claim 1, wherein both surfaces of the first lens are convex.

4. The lens module of claim 1, wherein an image-side surface of the second lens is convex.

5. The lens module of claim 1, wherein the third lens has negative refractive power.

6. The lens module of claim 1, wherein an object-side surface of the third lens is concave.

7. The lens module of claim 1, wherein the fourth lens has a meniscus shape, convex toward the image side.

8. The lens module of claim 1, wherein the object-side surface of the fifth lens is convex, and an image-side surface thereof is concave.

9. The lens module of claim 1, wherein the fifth lens has an inflection point formed on the object-side surface or an image-side surface thereof.

10. The lens module of claim 1, wherein the object-side surface of the sixth lens is convex.

11. The lens module of claim 1, wherein the image-side surface of the sixth lens is concave.

12. The lens module of claim 1, wherein the sixth lens has negative refractive power or positive refractive power.

13. The lens module of claim 1, wherein at least one of object-side surfaces and image-side surfaces of the first to sixth lenses is aspherical.

14. The lens module of claim 1, wherein an optical system including the first to sixth lens satisfies Conditional Equation 1:

$$0.6 < f1/f < 1.2 \quad \text{[Conditional Equation 1]}$$

where f is an overall focal length of the optical system, and f1 is a focal length of the first lens.

15. The lens module of claim 1, wherein an optical system including the first to sixth lens satisfies Conditional Equation 2:

$$|v2-v3| > 25.0 \quad \text{[Conditional Equation 2]}$$

where v2 is an abbe number of the second lens, and v3 is an abbe number of the third lens.

16. The lens module of claim 1, wherein an optical system including the first to sixth lens satisfies Conditional Equation 3:

$$0.8 < f2/f < 1.4 \quad \text{[Conditional Equation 3]}$$

where f2 is a focal length of the second lens, and f is an overall focal length of the optical system.

17. The lens module of claim 1, wherein an optical system including the first to sixth lens satisfies Conditional Equation 4:

$$0.5 < |f3/f| 21 \, 1.1 \quad \text{[Conditional Equation 4]}$$

where f3 is a focal length of the third lens, and f is an overall focal length of the optical system.

18. The lens module of claim 1, wherein an optical system including the first to sixth lens satisfies Conditional Equation 5:

$$f4/f < -10.0 \quad \text{[Conditional Equation 5]}$$

where f4 is a focal length of the fourth lens, and f is an overall focal length of the optical system.

19. The lens module of claim 1, wherein an optical system including the first to sixth lens satisfies Conditional Equation 6:

$$f5/f < -5.0 \quad \text{[Conditional Equation 6]}$$

where f5 is a focal length of the fifth lens, and f is an overall focal length of the optical system.

20. The lens module of claim 1, wherein an optical system including the first to sixth lens satisfies Conditional Equation 7:

$$|f6/f|>3.0 \quad \text{[Conditional Equation 7]}$$

where f6 is a focal length of the sixth lens, and f is an overall focal length of the optical system.

21. The lens module of claim 1, wherein an optical system including the first to sixth lens satisfies Conditional Equation 8:

$$OAL/f<1.4 \quad \text{[Conditional Equation 8]}$$

where OAL is a distance from an object-side surface of the first lens to an image surface, and f is an overall focal length of the optical system.

22. The lens module of claim 1, wherein an optical system including the first to sixth lens satisfies Conditional Equation 9:

$$0.4 \leq f1/f2 < 1.1 \quad \text{[Conditional Equation 9]}$$

where f1 is a focal length of the first lens, and f2 is a focal length of the second lens.

23. The lens module of claim 1, wherein an optical system including the first to sixth lens satisfies Conditional Equation 10:

$$|f2/f3|<1.5 \quad \text{[Conditional Equation 10]}$$

where f2 is a focal length of the second lens, and f3 is a focal length of the third lens.

24. The lens module of claim 1, wherein an optical system including the first to sixth lens satisfies Conditional Equation 11:

$$BFL/f>0.25 \quad \text{[Conditional Equation 11]}$$

where BFL is a distance from the image-side surface of the sixth lens to an image surface, and f is an overall focal length of the optical system.

25. The lens module of claim 1, wherein an optical system including the first to sixth lens satisfies Conditional Equation 12:

$$D1/f<0.5 \quad \text{[Conditional Equation 12]}$$

where D1 is an air gap between the first and second lenses, and f is an overall focal length of the optical system.

26. The lens module of claim 1, wherein an optical system including the first to sixth lens satisfies Conditional Equation 13:

$$r1/f>0.5 \quad \text{[Conditional Equation 13]}$$

where r1 is a radius of curvature of an object-side surface of the first lens, and f is an overall focal length of the optical system.

27. The lens module of claim 1, wherein an optical system including the first to sixth lens satisfies Conditional Equation 14:

$$|r4/f|<1.0 \quad \text{[Conditional Equation 14]}$$

where r4 is a radius of curvature of an image-side surface of the second lens, and f is an overall focal length of the optical system.

* * * * *